US008509071B1

(12) United States Patent
Narayanaswamy (10) Patent No.: US 8,509,071 B1
(45) Date of Patent: Aug. 13, 2013

(54) MULTI-DIMENSIONAL TRAFFIC MANAGEMENT

(75) Inventor: Krishna Narayanaswamy, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 259 days.

(21) Appl. No.: 12/963,149

(22) Filed: Dec. 8, 2010

Related U.S. Application Data

(60) Provisional application No. 61/390,340, filed on Oct. 6, 2010.

(51) Int. Cl.
*H04L 12/26* (2006.01)
(52) U.S. Cl.
USPC ......................................... 370/230; 370/235
(58) Field of Classification Search
USPC .............. 370/229, 230, 230.1, 231, 232, 235, 370/236
See application file for complete search history.

(56) References Cited

U.S. PATENT DOCUMENTS

| | | | |
|---|---|---|---|
| 6,222,856 B1 * | 4/2001 | Krishnan et al. | 370/468 |
| 6,826,694 B1 | 11/2004 | Dutta et al. | |
| 6,854,063 B1 | 2/2005 | Qu et al. | |
| 7,454,792 B2 | 11/2008 | Cantrell et al. | |
| 7,463,590 B2 | 12/2008 | Mualem et al. | |
| 7,725,558 B2 | 5/2010 | Dickenson | |
| 2003/0105976 A1 | 6/2003 | Copeland, III | |
| 2003/0154399 A1 | 8/2003 | Zuk et al. | |
| 2004/0193906 A1 * | 9/2004 | Dar et al. | 713/200 |
| 2004/0205360 A1 | 10/2004 | Norton et al. | |
| 2004/0268149 A1 | 12/2004 | Aaron | |
| 2005/0052992 A1 * | 3/2005 | Cloonan et al. | 370/229 |
| 2006/0101511 A1 | 5/2006 | Faillenot et al. | |
| 2006/0114832 A1 | 6/2006 | Hamilton et al. | |
| 2006/0123479 A1 | 6/2006 | Kumar et al. | |
| 2006/0259950 A1 | 11/2006 | Mattsson | |
| 2006/0268932 A1 | 11/2006 | Singh et al. | |
| 2007/0192863 A1 | 8/2007 | Kapoor et al. | |
| 2007/0230445 A1 | 10/2007 | Barrie et al. | |
| 2009/0046583 A1 * | 2/2009 | Towster et al. | 370/232 |
| 2010/0095367 A1 | 4/2010 | Narayanaswamy | |
| 2010/0177636 A1 * | 7/2010 | Sand et al. | 370/230 |
| 2010/0216424 A1 * | 8/2010 | Gans | 455/405 |

(Continued)

OTHER PUBLICATIONS

Dreger et al, "Dynamic application-layer protocol analysis for network intrusion detection," Proceedings of the Usenix Security Symposium, Jul. 31, 2006, pp. 257-272.

*Primary Examiner* — Kwang B Yao
*Assistant Examiner* — Nguyen Ngo
(74) *Attorney, Agent, or Firm* — Shumaker & Sieffert, P.A.

(57) ABSTRACT

The subject matter of this document can be implemented in, among other things, a method that includes receiving network traffic associated with a computing device, the network traffic including packet flows communicated between the computing device and a network. The method also includes monitoring the network traffic over time, and identifying a plurality of network usage characteristics associated with the network traffic. The network usage characteristics include a usage time that corresponds to an amount of time the computing device has been consuming network resources and a network application identifier that corresponds to a network application being used by the computing device. The method also includes determining whether the network traffic violates a network usage policy based on two or more of the network usage characteristics, and decreasing, over a period of time, throughput of the network traffic that is determined to be violative of the network usage policy.

19 Claims, 6 Drawing Sheets

(56) References Cited

U.S. PATENT DOCUMENTS

2011/0032821 A1* 2/2011 Morrill et al. ................ 370/230
2011/0145920 A1* 6/2011 Mahaffey et al. ............... 726/22
2011/0158090 A1* 6/2011 Riley et al. .................... 370/230

* cited by examiner

MULTI-DIMENSIONAL TRAFFIC MANAGEMENT

This application claims the benefit of U.S. Provisional Application No. 61/390,340, filed Oct. 6, 2010, the entire content of which is incorporated by reference herein.

TECHNICAL FIELD

The techniques described herein relate to computing networks and, more particularly, to managing traffic within computing networks.

BACKGROUND

Public Internet access has become fairly common in recent years. For example, many retail locations such as cafes, restaurants, book stores, electronics retailers, and the like have begun offering free Wi-Fi hotspots that allow their customers to access the Internet using the retailer's network. The reasons for offering Internet access to customers may be different for different types of retailers. In the case of cafes and restaurants, for example, free Internet access may be a way to draw customers in to their location, or to keep the customers there once they have arrived. In such an example, the retailers may expect that the more people present at their location for a longer period of time, the more products or services those people will purchase at the location. In the case of electronics retailers, for example, the products that the retailers are offering may have certain features that use the Internet, and by allowing access to the Internet, the customers are provided an opportunity to test those features while they are in the store and before buying the product.

The number and types of devices that are being used to access the Internet at locations offering public Internet access is constantly increasing. In the past, a relatively small number of people carried devices that could connect to Wi-Fi access points because those devices were typically larger and/or less capable than the devices that are presently available. Today, smaller and more capable devices are available, allowing many people to carry one or more Wi-Fi enabled devices (e.g., smart phones, laptop computers, tablets, netbooks, e-book readers, etc.) almost everywhere they go.

This increase in the devices requesting access to the Internet places a burden on the retailers and other public Internet access providers because there is only a finite amount of bandwidth that can be distributed amongst all of the provider's customers. This burden is often compounded by certain users who choose to abuse the public Internet access—e.g., by "squatting" at the hotspot location for inappropriately long periods of time and/or using bandwidth-intensive network applications such as peer-to-peer file sharing programs, video streaming applications, and the like. This type of abusive behavior can potentially lead to a loss of business for the public Internet access provider because the squatters take up physical space that may otherwise be used by other customers. Furthermore, the network may be overloaded by the use of bandwidth-intensive network applications such that other customers have less bandwidth available for the Internet uses that were intended by the provider.

SUMMARY

In general, this document describes techniques for intelligently managing network traffic by fairly allocating network bandwidth amongst multiple users of a provider network. Based on this fair allocation of network bandwidth, users who are using the network in an appropriate manner are provided with a positive user experience, while users who are using the network inappropriately are encouraged to change their behavior or disconnect from the network. As one example, according to the techniques of this disclosure, users who are deemed to be "squatting" or inappropriately using bandwidth-intensive network applications may be provided with decreased network bandwidth over time to encourage the users to terminate use of the network. As described herein, the techniques consider a plurality of different characteristics when determining the nature of usage for a given user and, as a result, a fair allocation of network bandwidth for that user. Each of these characteristics may be referred to as a different dimension, and qualities along all or some of the dimensions may influence a usage profile enforced for a given user. The techniques described herein apply to public Internet access providers, such as cafes, restaurants, book stores, electronics retailers, and the like, but also apply to other network providers who wish to intelligently manage their network traffic in an equitable manner.

As one example of the techniques described in this disclosure, a gateway that provides computing devices with access to a network, such as the Internet, monitors multiple characteristics of the communications between each of the computing devices and the network. As one example, the characteristics may relate to temporal characteristics of the network access (e.g., usage time) and, therefore, may be viewed as characterizing a time-based dimension for purposes of analysis by the gateway. As a second example, the gateway may apply deep-packet inspection to determine characteristics that are application-specific and, therefore, may be viewed as characterizing an application-based dimension. In some implementations, the techniques provide for the usage time to be analyzed on a per-application granularity. In addition, the characteristics may relate to raw bandwidth consumption and, therefore, characterize a bandwidth-based dimension. As such, the usage time for each application may be further parameterized with respect to bandwidth consumption for each type of application.

The gateway may also identify and parameterize the characteristics for a single user access session along all or some of the dimensions and apply a multi-dimensional analysis when determining and enforcing an appropriate usage profile for the user. Example characteristics may include such information as the total amount of time a device has been accessing the network, what network applications are being used by the device, the amount of time each of the network applications has been used, the total volume of traffic being transacted, the volume of traffic being transacted by each of the network applications, etc. The multiple characteristics are analyzed along the various dimensions to drive selection of a network usage policy that defines the types of behaviors that are considered to be abusive of the network.

For example, if a computing device has been using the network for thirty minutes (first characteristic being the amount of time on the network), and in particular using a peer-to-peer file sharing application over the network (second characteristic being the type of network application being used), and the amount of data transacted by the computing device exceeds fifty megabytes (third characteristic being the volume of traffic communicated over the network), then that device may be deemed to be abusing the network, depending on how the network usage policy classifies such behavior. In another example, if a computing device has been using the network for fifteen minutes, and in particular using an e-mail application over the network, and the amount of bandwidth used by the computing device is less than ten megabytes, then that device may be deemed not to be abusing the network.

In the examples above, if the network usage is deemed abusive, then the gateway may decrease the amount of bandwidth that is allocated to that device over time. For example, the device may initially be allocated a certain amount of bandwidth roughly equal to other non-abusive users of the network, but upon a determination that the device is violating the network usage policy, the bandwidth may be tapered down over the next ten minutes to fifty percent of the standard bandwidth allocation. Similarly, if the device continues to abuse the network access, the bandwidth allocated to the device may be further tapered down over the next ten minutes to ten percent of the standard bandwidth allocation. This tapering may discourage the abusive behavior, and may cause the user to correct the behavior or to disconnect from the network.

In one aspect, a method includes receiving, at a network device, network traffic associated with a computing device. The network traffic includes packet flows communicated between the computing device and a network via the network device. The method also includes monitoring the network traffic over time, and identifying, using the network device, a plurality of network usage characteristics associated with the network traffic. The network usage characteristics include a usage time that corresponds to an amount of time the computing device has been consuming network resources and a network application identifier that corresponds to a network application being used by the computing device that consumes network resources. The method further includes determining whether the network traffic violates a network usage policy based on two or more of the plurality of network usage characteristics, including the usage time and the network application identifier. The method also includes decreasing, over a period of time, throughput of the network traffic that is determined to be violative of the network usage policy.

In another aspect, a network device includes an interface configured to receive network traffic associated with a computing device. The network traffic includes packet flows communicated between the computing device and a network. The network device also includes a monitoring unit configured to monitor the network traffic over time and to identify a plurality of network usage characteristics associated with the network traffic. The network usage characteristics include a usage time that corresponds to an amount of time the computing device has been consuming network resources and a network application identifier that corresponds to a network application being used by the computing device that consumes network resources. The network device further includes a rules engine configured to determine whether the network traffic violates a network usage policy based on two or more of the plurality of network usage characteristics, including the usage time and the network application identifier. The network device also includes an allocation unit configured to decrease, over a period of time, throughput of the network traffic that is determined to be violative of the network usage policy.

The techniques described herein may provide one or more of the following advantages. The techniques may provide a bandwidth provider with intelligent mechanisms for individually controlling the bandwidth provided to users of the provider's network. The techniques may encourage abusive users of a network to improve their behavior or disconnect from the network, either of which results in more overall bandwidth available for non-abusive users of the network. This increased available bandwidth may improve the user experience for normal users of the network. In some implementations, network traffic for specific applications or application types may be adjusted individually such that only the network traffic related to abusive uses are decreased, while the user may still have bandwidth available for use in non-abusive communications. In such implementations, the abusive communications are discouraged, while still providing the user with a positive user experience for non-abusive communications.

The details of one or more implementations are set forth in the accompanying drawings and the description below. Other features, objects, and advantages will be apparent from the description and drawings, and from the claims.

BRIEF DESCRIPTION OF DRAWINGS

Like reference symbols in the various drawings indicate like elements.

DETAILED DESCRIPTION

Figure 1:
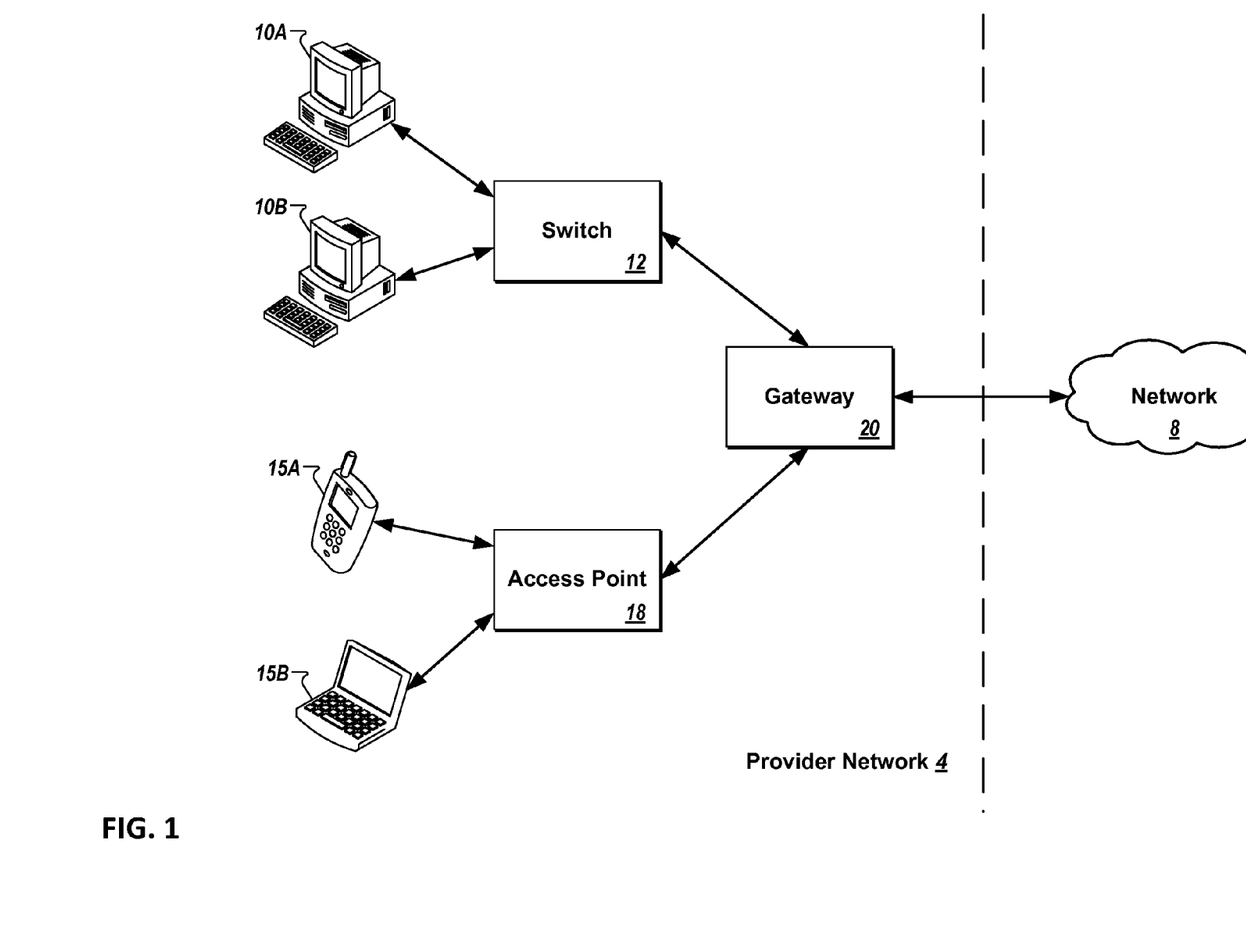
FIG. 1 is a conceptual diagram illustrating an example computer network system in which a network device applies traffic management policies in accordance with the principles of this disclosure.

FIG. 1 is a conceptual diagram illustrating an example computer network system in which a network device applies traffic management policies in accordance with the principles of this disclosure. The example computer network system includes a provider network 4 and an external network 8. Provider network 4 may be any computer network with multiple computing devices that access another network, e.g., external network 8, via a network device, e.g., gateway 20. For example, provider network 4 may be a hotspot location at a retail store location where customers are provided free Internet access while they are in the store.

In accordance with the principles of this disclosure, gateway 20 is used to intelligently manage network traffic based on multiple network usage characteristics associated with each of a number of computing devices. In operation, such traffic management techniques may provide users who are using the network appropriately with a positive user experience (e.g., by providing good network traffic throughput to the non-abusive users), and may encourage users who are abusing the network to change their behavior or disconnect from the network (e.g., by throttling network traffic throughput to the abusive users over time).

As described herein, gateway 20 may consider multiple network usage characteristics when determining the nature of usage for a given user and, as a result, may provide a fair allocation of network bandwidth for that user. These characteristics may be referred to as different dimensions, and qualities along all or a subset of the dimensions may influence a network usage profile enforced for a given user.

In the example network system, multiple wired computing devices 10A-10B and wireless computing devices 15A-15B of provider network 4 access external network 8, e.g., the Internet, via gateway 20. As shown in the example, wired computing devices 10A-10B are communicatively coupled to gateway 20 via a switch 12, and wireless computing devices 15A-15B are communicatively coupled to gateway 20 via an access point 18. In various implementations, there may be more or fewer wired and/or wireless computing devices than are shown in the example. In addition, each of the computing devices may include multiple mechanisms for communicating with gateway 20. For example, although wired computing device 10A is shown as communicatively coupled to switch 12, computing device 10A may also be configured to wirelessly connect to access point 18 using appropriate wireless networking protocols (e.g., via a wireless Ethernet adapter). Similarly, although wireless computing device 15B is shown as communicatively coupled to access point 18, computing device 15B may also be configured to connect to switch 12 using appropriate wired networking protocols (e.g., via a wired Ethernet adapter).

Gateway 20 is configured to monitor network traffic communicated between any of computing devices 10A-10B, 15A-15B and external network 8. As described in this disclosure, gateway 20 may apply a network usage policy to individually control access and bandwidth available to each of the computing devices based on the network usage characteristics associated with the network traffic to and from each of the individual devices. For example, a network usage policy may define traffic patterns that are considered abusive of the network access, and can define various traffic management approaches for handling network access by devices that are determined to be abusing the network access (e.g., by decreasing the bandwidth available to those devices).

Gateway 20 monitors multiple characteristics associated with the network traffic between a specific computing device, e.g., computing device 15B, and external network 8. As one example, the characteristics may include temporal characteristics of the network access (e.g., usage time) and, therefore, may be viewed as characterizing a time-based dimension for purposes of analysis by gateway 20. As a second example, gateway 20 may apply deep-packet inspection to determine characteristics that are application-specific and, therefore, may be viewed as characterizing an application-based dimension. In some implementations, the techniques provide for the usage time to be analyzed on a per-application granularity. In addition, the characteristics may relate to raw bandwidth consumption and, therefore, characterize a bandwidth-based dimension. As such, the usage time for each application may be further parameterized with respect to bandwidth consumption for each type of application.

Gateway 20 may also identify and parameterize the characteristics for a single user access session along all or a subset of the dimensions and apply a multi-dimensional analysis when determining and enforcing an appropriate usage profile for the user. Example characteristics may include such information as the total amount of time a device has been accessing the network, what network applications are being used by the device, the amount of time each of the network applications has been used, the total volume of traffic being transacted, the volume of traffic being transacted by each of the network applications, etc. These and other characteristics may be analyzed along the various dimensions to drive selection of a network usage policy that defines the types of behaviors that are considered to be abusive of the network. Other characteristics (e.g., user type) may also be monitored and analyzed, depending on the configuration of gateway 20 and the network usage policy that is to be enforced by gateway 20. As described above, these characteristics may be monitored on a per device basis (e.g., based on the IP address or MAC address of the device) such that the characteristics may be associated with a particular device and its specific network usage.

In addition to the monitored characteristics, gateway 20 may also monitor global network conditions that are associated with provider network 4 as a whole rather than to the individual devices. For example, some global network conditions may include the time of day, the overall network load, the number of users connected to external network 8 via gateway 20, and the like. These global network conditions and their effect on various usage rules may also be included in the network usage policy. For example, if only two users are accessing the network at 2:00 a.m., the controls associated with various usage characteristics (e.g., the amount of time spent accessing the network) as defined in the network usage policy may be loosened because the use is not adversely affecting the provider's business.

While monitoring the traffic flows between the computing devices and external network 8, gateway 20 may compare all or a subset of the network usage characteristics to a network usage policy that defines whether the communications are abusive of the network. The network usage policy can be implemented using a number of rules that are based on single characteristic thresholds, multiple characteristic thresholds, or a combination of single and multiple characteristic thresholds. As an example of a rule using a single characteristic threshold, if a user has been accessing the Internet for longer than two hours, then one implementation of a network usage policy may characterize the behavior as abusive regardless of any of the other network usage characteristics. As an example of a rule using a multiple characteristic threshold, if a user has been accessing the Internet for longer than half an hour, and such usage is associated with a high-bandwidth video streaming application, then the network usage policy may characterize the behavior as abusive, while accessing the Internet for longer than half an hour may not be characterized as abusive if the usage is associated with an e-mail application. These and other rules may be implemented in a network usage policy to define what types of behaviors constitute appropriate versus abusive network usage.

If gateway 20 determines that a particular behavior is abusive, gateway 20 decreases the amount of network bandwidth that is allocated to that device. For example, gateway 20 may initially distribute the available network bandwidth to all of the computing devices in network 4 in a roughly equal manner (e.g., devices 10A, 10B, 15A, and 15B are all allocated a quarter of the available network bandwidth). If gateway 20 determines that device 10B, for example, is abusing the network access, the bandwidth provided to device 10B is reduced, and may be reallocated amongst the other users.

The manner in which the bandwidth is reduced may also be defined in the network usage policy. In one example, upon a determination that device 10B is abusing the network access, the bandwidth to device 10B may be tapered down over the next ten minutes to fifty percent of the standard bandwidth allocation, and the bandwidth that is recovered from device 10B may be redistributed to the other non-abusive devices. In another example, the bandwidth may be immediately throttled to fifty percent of the standard bandwidth allocation. In other examples, various network usage characteristics may be used as inputs to a function that describes how the bandwidth is to be reduced to the offending device. For example, the offending application, transaction volume, and time may all be considered in determining how the bandwidth is reduced. Regardless of the manner in which the bandwidth is reduced, the reduction may discourage the abusive behavior, and may cause the user to correct the behavior or to disconnect from the network.

Figure 2:
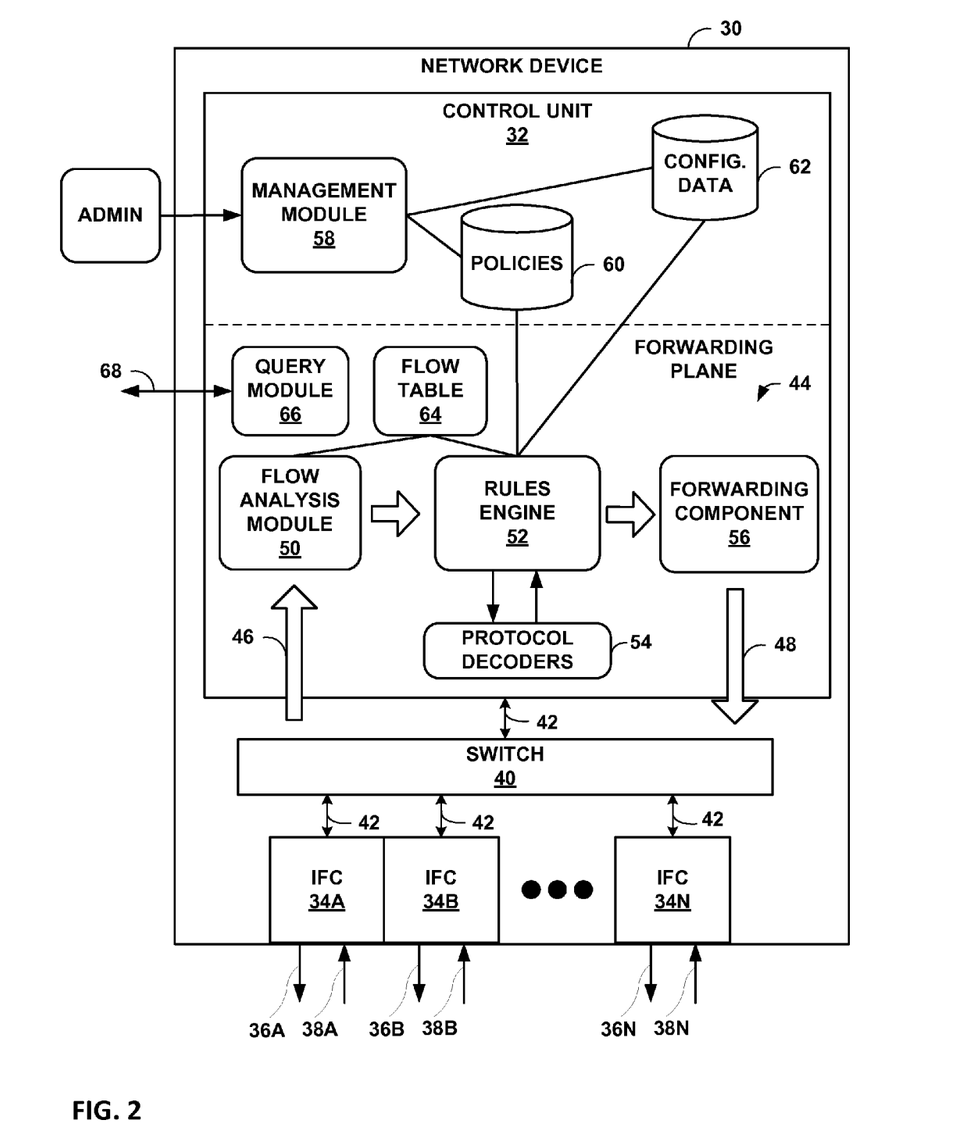
FIG. 2 is a block diagram illustrating an example of a network device in further detail.

FIG. 2 is a block diagram illustrating an example of a network device in further detail. Network device 30 may, for example, represent gateway 20 of FIG. 1. Network device 30 controls access between a provider network and an external network, e.g., the Internet, by applying traffic management policies to packet flows received by the network device.

Network device 30 includes a control unit 32 that determines where to send received packets and forwards the packets accordingly. In the illustrated example, network device 30 includes interface cards (IFCs) 34A-34N (collectively, "IFCs 34") for communicating packets via outbound links 36A-36N ("outbound links 36") and inbound links 38A-38N ("inbound links 38"). IFCs 34 are interconnected by a high-speed switch 40 and links 42. In one example, switch 40 comprises switch fabric, switchgear, a configurable network switch or hub, and the like. Links 42 comprise any form of communication path, such as electrical paths within an integrated circuit, external data busses, optical links, network connections, wireless connections, or other type of communication path. IFCs 34 are coupled to outbound links 36 and inbound links 38 via a number of interface ports (not shown).

Network device 30 also includes a forwarding plane 44 that transparently monitors inbound network traffic 46 and forwards the network traffic as outbound network traffic 48. In the illustrated example, forwarding plane 44 includes flow analysis module 50, rules engine 52, protocol decoders 54, and forwarding component 56, each of which is described in further detail below.

Control unit 32 of network device 30 includes a management module 58. Management module 58 presents a user interface by which an administrator configures network device 30, e.g., by modifying policies 60 or configuration data 62. Moreover, management module 58 may present a user interface by which an administrator may modify assumptions regarding packet flow characteristics, such as the highest priority packet flows for monitoring, port bindings and signatures for applications, or other features of managing network traffic as described herein. Management module 58 may present the user interface as a text-based command line interface, as a web browser-based interface, or other type of user interface.

The system administrator may configure network device 30 by interfacing with management module 58. The configuration information entered by the system administrator may be stored to configuration data 62. As another example, the system administrator may configure policies 60. Policies 60 may include network usage policies, application matching policies, and/or network security policies, for example.

According to the techniques of this disclosure, network device 30 supports a network usage policy that specifies how network traffic should be managed based on multiple network usage characteristics associated with the network traffic. Rules engine 52 accesses policies 60 to determine whether received network traffic is violative of the network usage policy. Policies 60 and configuration data 62 may be maintained in the form of one or more tables, databases, link lists, radix trees, databases, flat files, or any other data structures. Network device 30 then applies traffic management techniques described herein to control the bandwidth available for the network traffic. For example, if the network traffic is deemed violative of the network usage policy, the network traffic may be throttled to decrease the amount of network bandwidth available for abusive uses.

Network device 30 receives network traffic from external network 8 or one of the computing devices in the provider network on one of inbound links 38A of an IFC 34. Flow analysis module 50 receives the network traffic from switch 40 as inbound traffic 46 and identifies packet flows within the traffic. Each packet flow represents a flow of packets in one direction within the network traffic and is identified by at least a source address, a destination address, and a communication protocol. Flow analysis module 50 may utilize additional information to specify network flows, including source media access control ("MAC") address, destination MAC address, source port, and destination port. Other implementations may use other information to identify network flows, such as IP addresses, VLAN tags, MPLS labels, or other information.

In some cases, flow analysis module 50 may, based on analysis of the packet flow, determine a particular user associated with the packet flow. Query module 66 may issue a query 68 to a domain controller (not shown) with an IP address found in a header of packets in the packet flow to obtain a user name, user role, or other information associated with the IP address. Query module 66 may receive a response from the domain controller that provides the user name, user role, or other information associated with the IP address.

In general, rules engine 52 inspects application-layer data of the inbound traffic to dynamically identify a type of network application associated with each packet flow based on characteristics of the packet flow, such as by examining a signature of the payload of each packet. In this way the application identification is dynamic in that the determination is not based on a static port assignment for each type of application, but rather is based on the content of the packet. In some cases, the application determination process may take into consideration any identifiable handshaking or timing characteristics in the bidirectional packet flows for a communication session that indicate or suggest the type of application.

In some aspects, rules engine 52 may invoke the appropriate one of protocol decoders 54 based on the identified type of application determination to dynamically analyze the application-layer communications reassembled from the packet flow. Protocol decoders 54 represent a set of one or more protocol-specific software modules. Each of protocol decoders 54 corresponds to a different communication protocol or service. Examples of communication protocols that may be supported by protocol decoders 54 include the HyperText Transfer Protocol ("HTTP"), the File Transfer Protocol ("FTP"), the Network News Transfer Protocol ("NNTP"), the Simple Mail Transfer Protocol ("SMTP"), Telnet, Domain Name System ("DNS"), Gopher, Finger, the Post Office Protocol ("POP"), the Secure Socket Layer ("SSL") protocol, the Lightweight Directory Access Protocol ("LDAP"), Secure Shell ("SSH"), Server Message Block ("SMB"), and other protocols.

Protocol decoders 54 analyze reassembled application-layer communications and output transaction data that identifies application-layer transactions. In particular, the transaction data indicates when a series of related application-layer communications between two peer devices starts and ends. Rules engine 52 analyzes the reassembled data for the packet flow to identify the type of application and protocol associated with the packet flow. For example, in some implementations, rules engine 52 may utilize statistical analysis or other appropriate techniques to identify the application, e.g., an encrypted application, associated with the packet flow. If rules engine 52 is unable to identify the type of application and protocol associated with the packet flow, rules engine 52 may in some implementations use the well-known static port binding as a default application selection.

Flow analysis module 50 maintains data within flow table 64 that describes each active packet flow present within the network traffic. Flow table 64 specifies network elements associated with each active packet flow, i.e., information such as network addresses of source and destination devices, usernames, layer 7 application types, and ports associated with the packet flow. In addition, flow table 64 may identify pairs of packet flows that collectively form a single communication session between a client and server. For example, flow table 64 may designate communication session as pairs of packet flows in opposite directions for flows sharing at least some common network addresses, and layer four ports within transport layer protocol headers of packets.

In some implementations, network device 30 may also perform deep packet inspection. For example, rules engine 52 may include a stateful inspection engine that inspects both client-to-server packet flows as well as server-to-client packet flows in order to more accurately identify the type of application and underlying protocol for each communication session.

Upon determining the application and other network characteristics associated with the packet flows, rules engine 52 may use such information, along with usage characteristics associated with other various dimensions as described above, to determine whether the packet flows violate a network usage policy that defines the types of behaviors that are considered to be abusive of the network.

The architecture of network device 30 in FIG. 2 is shown for illustrative purposes only. This disclosure is not limited to the illustrated architecture. In other implementations, network device 30 may be configured in a variety of ways. In one implementation, for example, some of the functionality of control unit 32 may be distributed within IFCs 34. In a further implementation, control unit 32 may include a routing engine that performs routing functions and maintains a routing information base (RIB), e.g., routing information, and a forwarding engine that performs packet forwarding based on a forwarding information base (FIB), e.g., forwarding information, generated in accordance with the RIB. Moreover, although described with respect to network device 30, the forwarding techniques described herein may be applied to other types of network devices, such as gateways, switches, servers, workstations, or other network devices.

Control unit 32 may be implemented solely in software, or hardware, or may be implemented as a combination of software, hardware, or firmware. For example, control unit 32 may include one or more processors which execute software instructions. In that case, the various software modules of control unit 32 may comprise executable instructions stored on a computer-readable storage medium, such as computer memory or hard disk.

Figure 3:
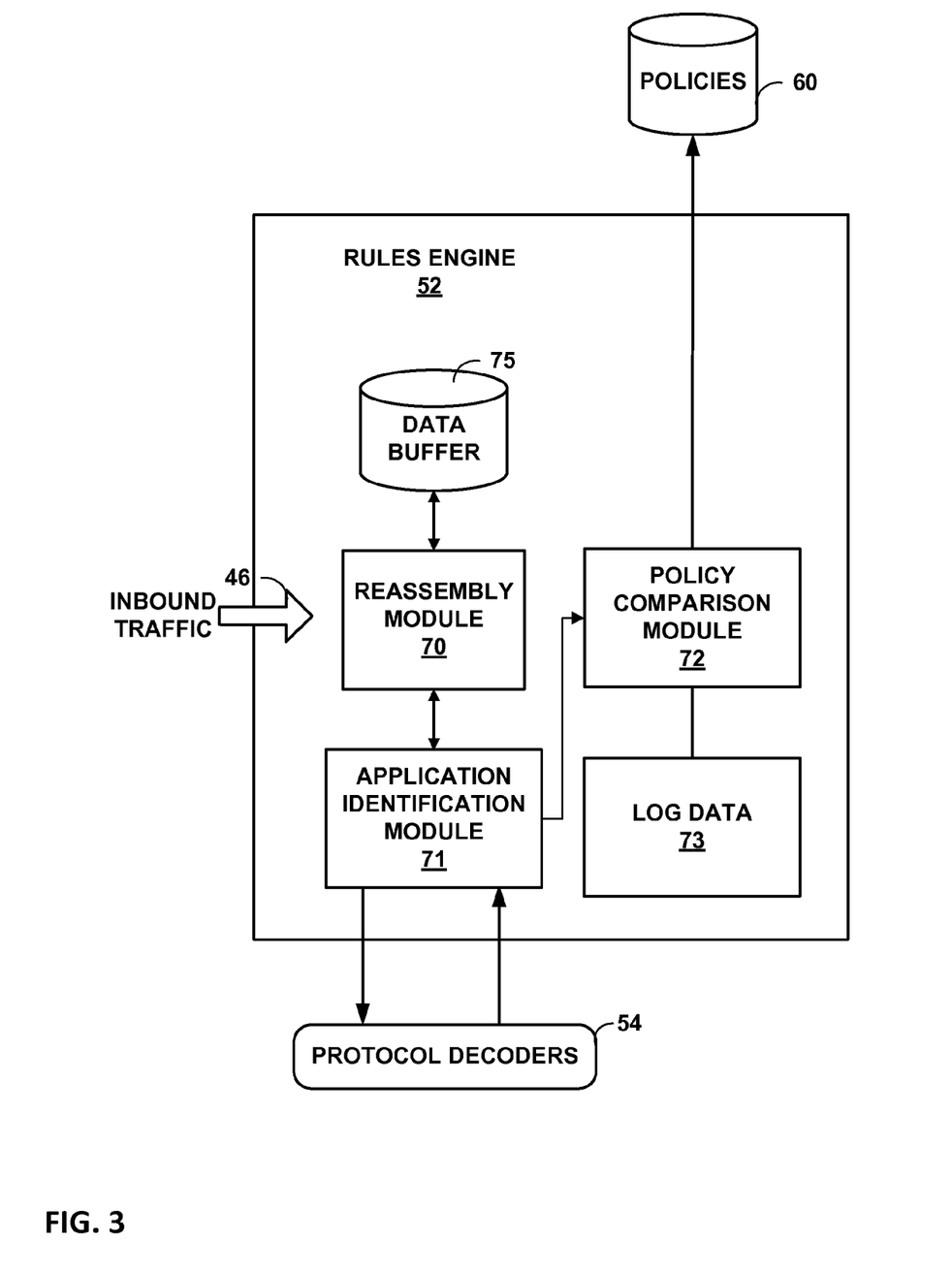
FIG. 3 is a block diagram that illustrates an example of a rules engine of the network device of FIG. 2 in further detail.

FIG. 3 is a block diagram that illustrates an example of a rules engine of the network device of FIG. 2 in further detail. In the example diagram, rules engine 52 includes reassembly module 70 and application identification module 71. In addition, rules engine 52 includes data buffer 75 and policy comparison module 72. Reassembly module 70 receives inbound network traffic 46 and reassembles application-layer communications from the packet flows. Reassembly module 70 forwards the reassembled application-layer communications to the appropriate protocol decoders 54 for processing.

Application identification module 71 identifies the type of application for each intercepted communication session, such as SQL query using HTTP. When rules engine 52 receives a packet as part of a packet flow, reassembly module 70 buffers the packet in data buffer 75. In one implementation, data buffer 75 may store data as a sliding window. That is, data buffer 75 may store data until becoming full or reaching a specified required amount of minimum data for identification. When full, data buffer 75 discards certain data to make room for storing new data. In one implementation, data buffer 75 may store and discard data according to a first-in, first-out ("FIFO")-like protocol where the first data to be stored is the first data to be discarded when data buffer 75 becomes full. In another implementation, data buffer 75 may discard data according to a least recently used protocol such that when data buffer 75 is full, the packet flow which has been least recently used will be discarded to make room for new data to be stored.

In one implementation, reassembly module 70 may associate packets in a packet flow, and packet flows as a communication session, according to the 5-tuple {source IP address, destination IP address, protocol, source port, destination port}. Other implementations may use other forms of associating packets. For example, in one implementation, network device 30 may be part of a network that utilizes virtual local area networks (VLANs). Accordingly, reassembly module 70 may associate packets in a packet flow according to a VLAN identifier, a source address, and a destination address. In any case, reassembly module 70 may utilize the information maintained within flow table 64 (FIG. 2) to reassemble network data, e.g., to form reassembled TCP data.

Application identification module 71 analyzes the reassembled data for the packet flow to identify the type of application associated with the packet flow. For example, in some implementations, application identification module 71 may utilize statistical analysis or other appropriate techniques to identify the application or type of application associated with the packet flow. If application identification module 71 is unable to identify the type of application associated with the packet flow, application identification module 71 may use the well-known static port binding as a default application selection. Moreover, an administrator may configure the static port mapping using management module 58.

In some cases, application identification module 71 may not be able to identify the application and the static port mapping may not have an entry for the requested port number. Various implementations may treat this situation according to specifications of, for example, a system administrator. For example, in one implementation, network device 30 may simply forward packet flows with undetermined application types that cannot be determined by static port mapping as an unknown application, and may treat the application as a non-abusive application because it is not an application that has been identified as abusive. In other implementations, network device 30 may forward the packet flows as a flagged application, and may treat the application as an abusive application.

Application identification module 71 may include a hierarchically-ordered list of similar application types. Application identification module 71 may store this list as a tree structure in a computer-readable medium. Management module 58 may provide an administrator with a user interface to modify the contents and hierarchy of the list. Upon receiving a packet flow which may belong to one of several similar applications, application identification module 71 may make a preliminary best guess of the application by selecting the type of application designated as the highest ordered application in the list to which the packet flow corresponds. As application identification module 71 receives more information about the packet flow, application identification module 71 may alter the original determination accordingly. After determining an application, application identification module 71 may cache the determination for subsequent comparison.

Application identification module 71 may also provide the identified application, application type, and/or other application-related information (e.g., application protocols) to policy comparison module 72 to be used as network usage characteristics associated with the packet flows. Policy comparison module 72 may use such information, along with usage characteristics associated with other various dimensions (e.g., time-based or volume-based dimensions as described above), to determine whether the packet flows violate a network usage policy that defines the types of behaviors that are considered to be abusive of the network.

Policy comparison module 72 of rules engine 52 compares the network usage characteristics (including identified characteristics of the packet flows and the longer-term usage characteristics of the device) to one or more of policies 60, e.g., a network usage policy. The longer-term usage characteristics correspond to usage characteristics that have been collected over a period of time. The longer-term usage characteristics may be stored in log data 73, and may include, for example, the total amount of time the device has been accessing the network, the volume of data that has been transacted between the device and the network, and the like.

In some implementations, a network usage policy may include thresholds associated with one or more of the network usage characteristics, and policy comparison module 72 may compare the network usage characteristics to the thresholds to determine whether the network usage is abusive. Policy comparison module 72 may use a variety of methods for performing the comparison. For example, policies 60 may be referenced using a hash implementation. As another example, policies 60 may be maintained as a data structure in which policy comparison module 72 looks up a first characteristic, and is then directed to a given portion of the data structure based on the first characteristic, in which policy comparison module 72 then looks up the second characteristic, and so on. For example, policy comparison module 72 may first look up the user role characteristic of the packet flow, and then be directed to a subset of the data structure specific to that user role. Policy comparison module 72 may then look up the application type of the packet flow within the branch that is specific to the user role, and then be directed to a further subset of the data structure specific to that application type.

Figure 4:
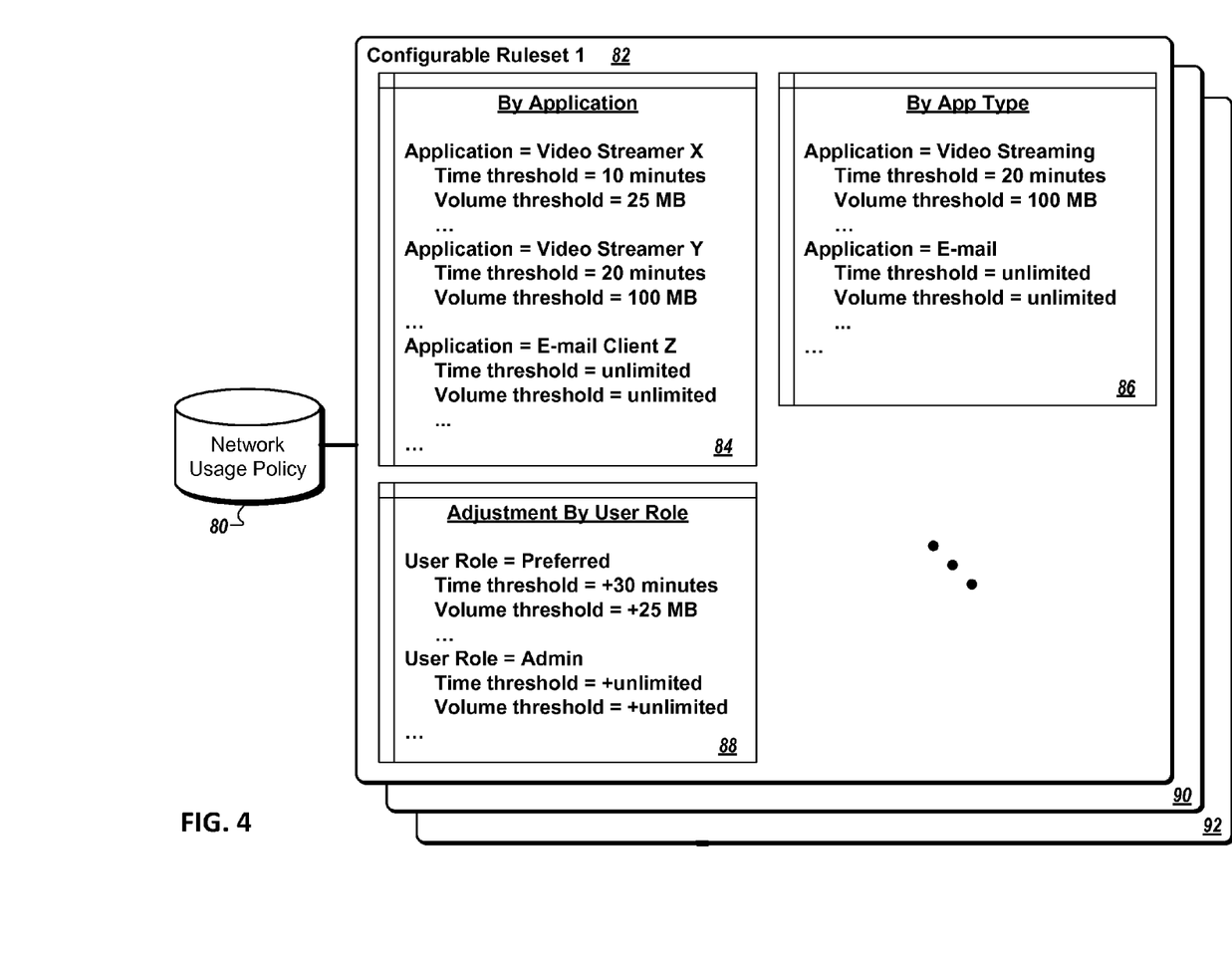
FIG. 4 is a conceptual diagram that illustrates an example network usage policy.

FIG. 4 is a conceptual diagram that illustrates an example network usage policy 80. As shown, network usage policy 80 may include one or more configurable rulesets 82, 90, 92. As described above, the rulesets may be utilized by a rules engine, e.g., rules engine 52, to determine whether network traffic is abusive. It should be understood that the example rules and rulesets are merely illustrative, and should not be considered to limit this disclosure.

Each of the configurable rulesets may include a number of different rules. For example, in a first configurable ruleset 82, a number of threshold rules are defined. The rules are shown grouped into various categories, e.g., a "by application" category 84, a "by app type" category 86, and an "adjustment by user role" category 88. Such categorization is provided for illustrative purposes to show an example organization of the individual rules. In operation, such various types of organization (e.g., hierarchical organization) may be used to increase the efficiency of the rules engine by allowing the rules engine to find and apply the appropriate rule more quickly.

In example category 84, which groups the rules by application, specific applications are the basis for defining variable thresholds. For example, if the application is Video Streamer X, then the time threshold is set as ten minutes, and the volume threshold is set as twenty-five megabytes. Similarly, if the application is Video Streamer Y, then the time threshold is set as twenty minutes, and the volume threshold is set as 100 megabytes. Also, if the application is E-mail Client Z, then there are no time or volume thresholds, meaning that the computing device may use E-mail Client Z for any amount of time, and may transact unlimited amounts of data without violating the network usage policy.

In example category 86, which groups the rules by application type, application types rather than specific applications are the basis for defining variable thresholds. For example, if the application type is Video Streaming, then the time threshold is twenty minutes, and the volume threshold is 100 megabytes. Similarly, if the application type is E-mail, then there are no time or volume thresholds placed on the network usage.

Example categories 84 and 86 illustrate overlapping, but consistent rules that may be used to determine whether network usage is abusive according to a particular network usage policy. Such rules may be utilized if incomplete information is available for one or more of the identified usage characteristics. For example, a number of different Video Streaming types of applications may be identified in a ruleset (e.g., Video Streamer X and Video Streamer Y in ruleset 82), but there may be other network traffic that exhibits the characteristics of Video Streaming, but is not associated with either of the specifically-identified Video Streamer applications. In such a case, a more general rule may be applied to such traffic, as is illustrated by the rule shown in category 86.

In addition to specified rules and thresholds, threshold adjustments may also be defined in network usage policy 80. These threshold adjustments are shown in category 88. In example category 88, adjustment rules are defined based on the user role that is associated with a particular network usage. For example, the above mentioned rules in categories 84 and 86 may initially be identified as applicable, but if a certain user role is determined, such rules may be adjusted. In the case of a preferred user, for example, the standard rule may be identified (e.g., for Video Streamer X, the time threshold is ten minutes), but then adjusted to account for the user role (e.g., rather than a ten minute time threshold, the threshold may be adjusted to forty minutes). Similarly, in the case of an administrative user, all thresholds may be turned off such that the bandwidth to the administrator is never throttled, regardless of usage.

Figure 5A:
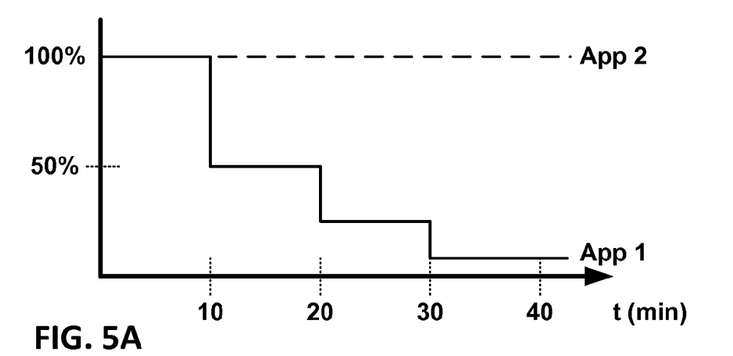
FIGS. 5A-5C are example traffic management timing diagrams.
Figure 5B:
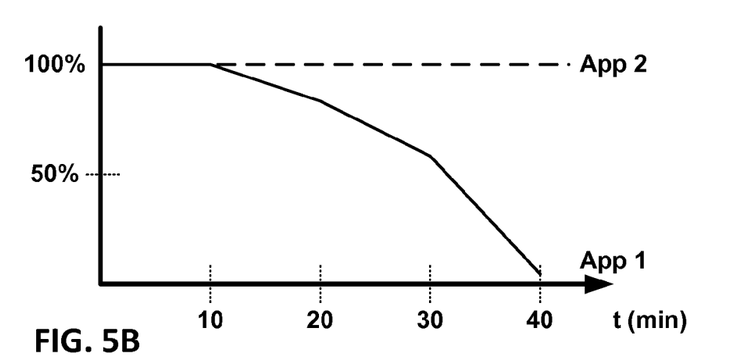
Figure 5C:
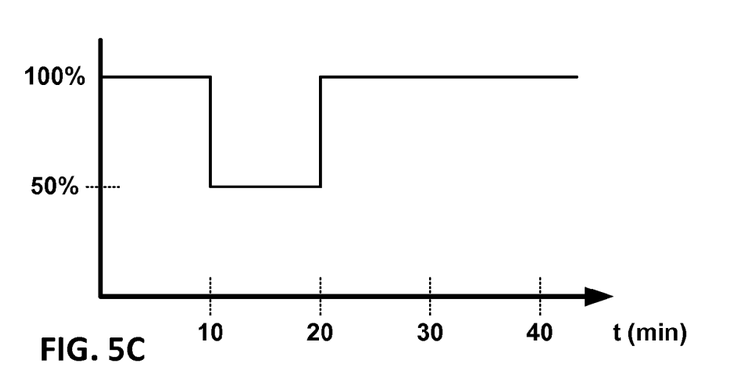

FIGS. 5A-5C are example traffic management timing diagrams. The traffic management timing diagrams illustrate different ways in which bandwidth may be allocated to a device over time according to the techniques described in this disclosure. Regardless of the manner in which the bandwidth is allocated, the bandwidth allocation may be configured to discourage abusive behavior, and may cause abusive users to correct their behavior or to disconnect from the network.

FIG. 5A shows a timing diagram divided into ten minute segments. The solid line represents a step-wise reduction in bandwidth available to a device that is deemed to be violating the network usage policy according to the techniques described above. In the diagram, the device begins violating the network usage policy after ten minutes of usage, and as such, the bandwidth allocated to the device is reduced to fifty percent of the standard bandwidth that is allocated to non-abusive devices. After another ten minutes, the device is still violating the network usage policy, and the bandwidth allocated to the device is further reduced to twenty-five percent of the standard bandwidth. After another ten minutes, the device is still violating the network usage policy, and the bandwidth allocated to the device is further reduced to ten percent of the standard bandwidth.

The step-wise reduction in bandwidth may be applied per device (as described above), or may be more selectively applied per application. For the case in which bandwidth is reduced per application, the bandwidth associated with an abusive application may be reduced as described above, while the bandwidth associated with non-abusive applications may be maintained at a standard level. In the diagram, App 1 is the abusive application, and as such, the bandwidth associated with App 1 is reduced in a step-wise manner as shown by the solid line. App 2, on the other hand, is not an abusive application, and therefore, the bandwidth associated with App 2 is maintained at the full standard bandwidth allocation as shown by the dashed line.

In other implementations, the bandwidth available to non-abusive applications may be reduced by some amount, but not to the extent that bandwidth associated with abusive applications is reduced. For example, the bandwidth available to non-abusive App 2 may be reduced in a step-wise manner similar to the bandwidth available to abusive App 1, but less of a reduction may be applied to the non-abusive application. In the example above, rather than dropping from full bandwidth, to fifty percent, to twenty-five percent, and then to ten percent as is the case for the abusive application, bandwidth available to non-abusive applications may be dropped from full bandwidth, to seventy-five percent, to fifty percent, and then to twenty percent.

As another example, the bandwidth available to a non-abusive application may be reduced by a certain defined amount if the device is deemed to be abusing the network. For example, if any of the applications is deemed to be abusing the network, then one or more of the non-abusive applications may only be allocated seventy-five percent (e.g., a twenty-five percent reduction) of the standard bandwidth allocation that is provided to non-abusive devices. In some implementations, such a reduction may be multiplied by the number of abusive applications being used by the device (e.g., a twenty-five percent reduction per abusive application), or by the amount of time the abuse has been continuing (e.g., a twenty-five percent reduction per ten minutes of continued abuse), for example.

FIG. 5B shows a similar timing diagram to that shown in FIG. 5A, but rather than utilizing a step-wise reduction in bandwidth available to a device that is deemed to be violating the network usage policy, a tapered reduction is utilized. In the diagram, the device begins violating the network usage policy after ten minutes of usage. According to the network usage policy, the bandwidth allocated to the device is gradually reduced over the next ten minutes to eighty percent of the standard bandwidth. If the device continues to violate the network usage policy, the bandwidth allocated to the device is reduced (at a slightly greater rate than the first ten minutes) over the next ten minutes to fifty-five percent of the standard bandwidth. Assuming that the abusive behavior continues, the bandwidth allocated to the device is reduced (at an even greater rate) over the next ten minutes to five percent of the standard bandwidth.

Similarly to the example above in FIG. 5A, the reduction in bandwidth may be applied per device, or may be more selectively applied per application. In the diagram, App 1 is the abusive application, and as such, the bandwidth associated with App 1 is reduced as shown by the solid line. App 2, on the other hand, is not an abusive application, and therefore, the bandwidth associated with App 2 is maintained at the full standard bandwidth allocation as shown by the dashed line. In other implementations, the bandwidth available to non-abusive applications may also be decreased to a lesser extent as described in the examples above.

FIG. 5C shows a similar timing diagram to that shown in FIG. 5A, but rather than continuing the abusive behavior, the device discontinues its abusive behavior after a period of time. As shown in the diagram, the device begins violating the network usage policy after ten minutes of usage, and as such, the bandwidth allocated to the device is reduced to fifty percent of the standard bandwidth that is allocated to non-abusive devices. After another ten minutes, the device has discontinued its abusive behavior, and as such, the bandwidth allocated to the device is restored to the standard bandwidth.

Figure 6:
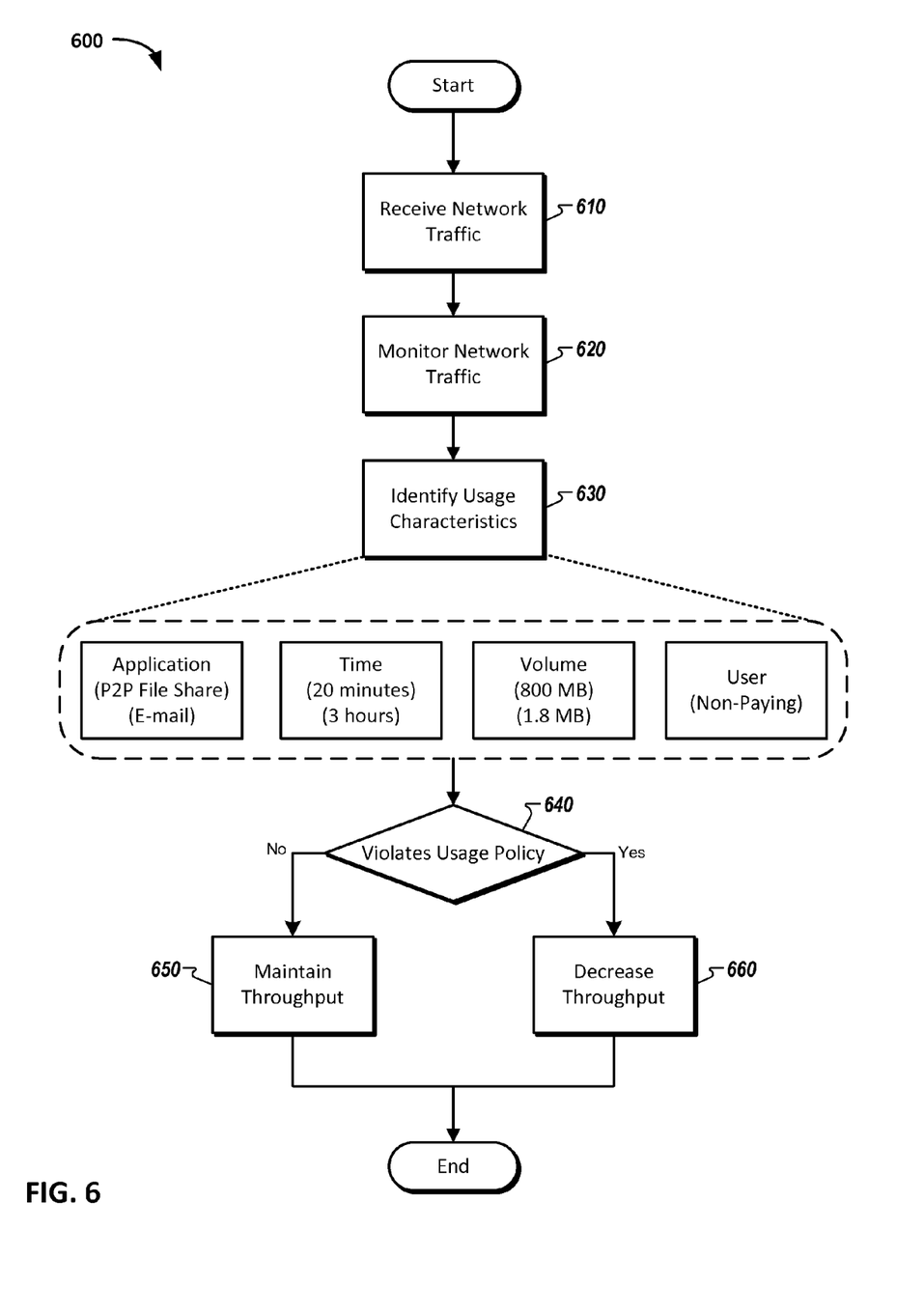
FIG. 6 is a flow diagram illustrating an example process for performing traffic management.

FIG. 6 is a flow diagram illustrating an example process 600 for performing traffic management. Example process 600 may be used by a network device, e.g., gateway 20, to determine whether network traffic to and from a computing device, e.g., computing device 15A, is violative of a network usage policy based on a number of network usage characteristics associated with the computing device. If the network traffic is determined to be violative of the network usage policy, gateway 20 can decrease network throughput to the computing device.

Example process 600 begins with a network device receiving network traffic (610). As described above, the network device may be a gateway device that directs network traffic between a computing device in a provider network and an external network such as the Internet. As such, the received network traffic may include packet flows received from the computing device that are destined for the external network and/or packet flows received from the external network that are destined for the computing device.

The network device monitors the network traffic (620). Monitoring the network traffic may include both contemporaneous and long-term monitoring. For example, as packet flows are received, the network device may analyze the packets in approximately real-time to determine information about the packets. In addition, the network device may also aggregate information about packets that have been received over a period of time, and may organize such aggregate information as appropriate. As one example of organizing aggregate information, the network device may collect information over time, and compile trending statistics related to the packet flows that have been received. In some implementations, such trending information may be utilized in various rules defined in the network usage policy.

The network device also identifies usage characteristics that are associated with the network traffic (630). The usage characteristics may include such information as the total amount of time a device has been accessing the network, what network applications are being used by the device, the amount of time each of the network applications has been used, the total volume of traffic being transacted, the volume of traffic being transacted by each of the network applications, and the like.

The usage characteristics that are identified may be configurable such that an administrator can configure the network device to only identify characteristics that are relevant to a particular network usage policy. For example, if a network usage policy uses characteristics such as application type, time, and volume to determine whether network traffic is abusive, but does not rely upon other characteristics such as a user type, then only the relevant usage characteristics may be monitored and collected.

The usage characteristics identified in example process 600 include application, time, volume, and user. Furthermore, some of the usage characteristics have been aggregated by the application type. For example, in example process 600, a P2P File Share application has been used for twenty minutes and has transacted 800 megabytes of data, while an E-mail application has been used for three hours and has transacted 1.8 megabytes of data.

The identified usage characteristics are then compared to the network usage policy to determine whether the usage violates the policy (640). This determination may include, for example, comparing each of the identified network usage characteristics to their associated threshold values in the network usage policy, and if any of the network usage characteristics exceed or otherwise fall outside an acceptable range of values defined in the network usage policy, then the usage may be considered in violation of the policy. In other implementations, if a single network usage characteristic exceeds its associated threshold value, the usage may not be considered violative, while if two or more network usage characteristics exceed their respective associated threshold values, the usage may be deemed violative. Other configurations are also possible, and may be configured into a rules engine that accepts all of the identified usage characteristics as inputs, and outputs a determination of whether the network usage is violative.

If the network usage does not violate the usage policy, then the throughput to the computing device is maintained (650). Otherwise, the throughput to the computing device is decreased in any of a variety of configurable manners (660) as described in greater detail above. Regardless of the manner in which the throughput is decreased, the decrease may be configured to discourage the violative behavior, and may cause the user to correct the behavior or to disconnect from the network.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" generally refers to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium generally cause a programmable processor, or other processor, to perform the method, e.g., when the instructions are executed. Computer readable storage media include, for example, random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media. In this sense, the computer-readable storage medium may comprise a non-transitory computer-readable storage medium.

A number of implementations have been described. Nevertheless, it will be understood that various modifications may be made without departing from the spirit and scope of the disclosure. For example, much of this document has been described with respect to managing public Internet access in a wireless hotspot, but other network access environments may also employ the techniques described herein. As another example, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method for controlling public network access at a wireless hotspot of a retail store, the method comprising:
   receiving, at a network gateway device, network traffic associated with a customer computing device associated with a customer of the retail store, the network traffic comprising packet flows communicated between the customer computing device and an external network via the network gateway device;
   monitoring the network traffic of the customer computing device over time;
   identifying a plurality of network usage characteristics associated with the network traffic, the network usage characteristics including a usage time that corresponds to a total amount of time the customer computing device has been accessing the external network and a network application identifier that corresponds to a network application being used by the customer computing device that consumes network resources;
   determining that the network traffic for the customer violates a network usage policy for individual customers when the total amount of time that the customer has been accessing the external network exceeds a defined threshold; and
   decreasing, over a period of time, throughput of the network traffic that is determined to be violative of the network usage policy.

2. The method of claim 1, wherein decreasing throughput of the network traffic comprises providing throughput of the network traffic of the customer at a first level, and tapering the throughput of the network traffic for the customer during the period of time to a second level that is lower than the first level.

3. The method of claim 1, wherein decreasing throughput of the network traffic comprises decreasing throughput of all of the network traffic associated with the computing device over the period of time.

4. The method of claim 1, wherein decreasing throughput of the network traffic comprises decreasing throughput of the network traffic associated with a first network application over the period of time and maintaining throughput of the network traffic associated with a second network application over the period of time.

5. The method of claim 1, wherein identifying the network application identifier comprises reassembling application-layer data from within payloads of packets of the network traffic, and inspecting the reassembled application-layer data to identify the network application being used by the computing device.

6. The method of claim 1, wherein the network usage characteristics include an amount of data that has been communicated between the computing device and the network, and wherein determining whether the network traffic violates the network usage policy is based on three or more network usage characteristics, including the amount of data that has been communicated.

7. The method of claim 1, wherein the network usage characteristics include an amount of data that the network application has communicated between the computing device and the network, and wherein determining whether the network traffic violates the network usage policy is based on three or more network usage characteristics, including the amount of data that the network application has communicated.

8. The method of claim 1, wherein the network usage characteristics include an amount of time that the network application has been consuming network resources, and wherein determining whether the network traffic violates the network usage policy is based on three or more network usage characteristics, including the amount of time that the network application has been consuming network resources.

9. The method of claim 1, further comprising identifying a user type associated with a user of the customer computing device, and wherein the network usage characteristics include the identified user type, and wherein determining whether the network traffic violates the network usage policy is based on three or more network usage characteristics, including the identified user type.

10. A network device comprising:
an interface configured to receive network traffic associated with a customer computing device associated with a customer of the retail store, the network traffic comprising packet flows communicated between the computing device and an external network;
a monitoring unit configured to monitor the network traffic of the customer computing device over time and to identify a plurality of network usage characteristics associated with the network traffic, the network usage characteristics including a usage time that corresponds to an amount of time the computing device has been consuming network resources and a network application identifier that corresponds to a network application being used by the customer computing device that consumes network resources;
a rules engine configured to determine that the network traffic for the customer violates a network usage policy for individual customers when a total amount of time that the customer has been accessing the external network exceeds a defined threshold; and
an allocation unit configured to decrease, over a period of time, throughput to the customer computing device of the network traffic that is determined to be violative of the network usage policy.

11. The network device of claim 10, wherein decreasing throughput of the network traffic comprises providing throughput of the network traffic at a first level, and tapering the throughput of the network traffic during the period of time to a second level that is lower than the first level.

12. The network device of claim 10, wherein decreasing throughput of the network traffic comprises decreasing throughput of all of the network traffic associated with the computing device over the period of time.

13. The network device of claim 10, wherein decreasing throughput of the network traffic comprises decreasing throughput of the network traffic associated with a first network application over the period of time and maintaining throughput of the network traffic associated with a second network application over the period of time.

14. The network device of claim 10, wherein identifying the network application identifier comprises reassembling application-layer data from within payloads of packets of the network traffic, and inspecting the reassembled application-layer data to identify the network application being used by the computing device.

15. The network device of claim 10, wherein the network usage characteristics include an amount of data that has been communicated between the computing device and the network, and wherein determining whether the network traffic violates the network usage policy is based on three or more network usage characteristics, including the amount of data that has been communicated.

16. The network device of claim 10, wherein the network usage characteristics include an amount of data that the network application has communicated between the computing device and the network, and wherein determining whether the network traffic violates the network usage policy is based on three or more network usage characteristics, including the amount of data that the network application has communicated.

17. The network device of claim 10, wherein the network usage characteristics include an amount of time that the network application has been consuming network resources, and wherein determining whether the network traffic violates the network usage policy is based on three or more network usage characteristics, including the amount of time that the network application has been consuming network resources.

18. The network device of claim 10, further comprising a user identification unit to identify a user type associated with a user of the computing device, and wherein the network usage characteristics include the identified user type, and wherein determining whether the network traffic violates the network usage policy is based on three or more network usage characteristics, including the identified user type.

19. A non-transitory computer-readable storage medium comprising instructions that, when executed, cause one or more processors to control public network access at a wireless hotspot of a retail store by:
receive, at a network gateway device, network traffic associated with a customer computing device, the network traffic comprising packet flows communicated between the customer computing device and a network via the network device;
monitor the network traffic over time;
identify, using the network device, a plurality of network usage characteristics associated with the network traffic, the network usage characteristics including a usage time that corresponds to an amount of time the computing device has been consuming network resources and a network application identifier that corresponds to a network application being used by the customer computing device that consumes network resources;
determine that the network traffic for the customer violates a network usage policy for individual customers when a total amount of time that the customer has been accessing the external network exceeds a defined threshold; and
decrease, over a period of time, throughput of the network traffic that is determined to be violative of the network usage policy.

* * * * *